(12) United States Patent
Asako (10) Patent No.: US 11,222,218 B2
(45) Date of Patent: Jan. 11, 2022

(54) VEHICLE EXTERIOR ENVIRONMENT DETECTION APPARATUS

(71) Applicant: SUBARU CORPORATION, Tokyo (JP)

(72) Inventor: Junichi Asako, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 274 days.

(21) Appl. No.: 16/719,322

(22) Filed: Dec. 18, 2019

(65) Prior Publication Data
US 2020/0293798 A1 Sep. 17, 2020

(30) Foreign Application Priority Data

Mar. 11, 2019 (JP) .............................. JP2019-043516
Sep. 3, 2019 (JP) .............................. JP2019-160293

(51) Int. Cl.
*G06K 9/00* (2006.01)
*B60R 11/04* (2006.01)
(Continued)

(52) U.S. Cl.
CPC .......... *G06K 9/00805* (2013.01); *B60R 11/04* (2013.01); *G06K 9/00201* (2013.01);
(Continued)

(58) Field of Classification Search
CPC .......... G06K 9/00805; G06K 2209/23; G06K 9/00201; G06K 9/44; G06K 9/00791;
(Continued)

(56) References Cited

U.S. PATENT DOCUMENTS

2006/0182313 A1* 8/2006 Miyahara ............. G06K 9/3241
382/104
2007/0154068 A1* 7/2007 Stein ....................... G01S 17/93
382/106
(Continued)

FOREIGN PATENT DOCUMENTS

EP 3 121 791 A1 1/2017
JP 2008-123462 A 5/2008
(Continued)

OTHER PUBLICATIONS

Real-time Monocular Ranging by Bayesian Triangulation (Year: 2013).*

(Continued)

*Primary Examiner* — Nizar N Sivji
(74) *Attorney, Agent, or Firm* — McDermott Will & Emery LLP (57) ABSTRACT

A vehicle exterior environment detection apparatus includes an image width calculator, a predicted distance calculator, and a relative distance calculator. The image width calculator calculates a first image width of a target vehicle on the basis of a first image. The predicted distance calculator calculates a first predicted distance to the target vehicle on the basis of the first image width. The relative distance calculator calculates a first reliability of the first image width, and, when the first reliability is higher than a predetermined threshold, calculates a first real width of the target vehicle on the basis of the first image width and the first predicted distance, updates a smoothed real width by performing smoothing processing on the basis of the first real width, and calculates a first distance to the target vehicle on the basis of the smoothed real width and the first image width.

9 Claims, 7 Drawing Sheets

(51) Int. Cl.
*G06K 9/44* (2006.01)
*H04N 5/225* (2006.01)

(52) U.S. Cl.
CPC ............ *G06K 9/44* (2013.01); *G06K 2209/23* (2013.01); *H04N 5/2253* (2013.01)

(58) Field of Classification Search
CPC .... B60R 11/04; H04N 5/2226; H04N 5/2253; H04N 13/239; H04N 2013/0081
See application file for complete search history.

(56) References Cited

U.S. PATENT DOCUMENTS

| | | | |
|---|---|---|---|
| 2008/0136612 A1 | 6/2008 | Machii et al. | |
| 2008/0180528 A1* | 7/2008 | Saito | G06K 9/00825 348/148 |
| 2009/0244263 A1* | 10/2009 | Saito | G06K 9/00805 348/47 |
| 2014/0293052 A1* | 10/2014 | Kuehnle | G06K 9/00791 348/148 |
| 2015/0091715 A1* | 4/2015 | Nomura | H04N 13/257 340/435 |
| 2015/0334269 A1* | 11/2015 | Yokota | B60W 30/143 382/103 |
| 2016/0014406 A1* | 1/2016 | Takahashi | G06T 7/246 348/148 |
| 2016/0304097 A1* | 10/2016 | Taira | G06K 9/00791 |
| 2017/0091566 A1* | 3/2017 | Kasaoki | H04N 5/2351 |
| 2018/0075752 A1* | 3/2018 | Chundrlik, Jr. | B60T 8/171 |
| 2018/0330481 A1* | 11/2018 | Watanabe | G06T 7/285 |
| 2019/0286149 A1* | 9/2019 | Miura | G01C 21/3415 |
| 2020/0255005 A1* | 8/2020 | Matsunaga | B60W 30/16 |

FOREIGN PATENT DOCUMENTS

| | | |
|---|---|---|
| JP | 2008-186344 A | 8/2008 |
| JP | 2014-238156 A | 12/2014 |
| JP | 2015-087323 A | 5/2015 |
| JP | 2016-060303 A | 4/2016 |
| JP | 2017-027602 A | 2/2017 |

OTHER PUBLICATIONS

Vehicle Recognition and TTC Estimation at Night based on Spotlight Pairing (Year: 2009).*
Technique of Measuring Leading Vehicle Distance Based on Digital Image Processing Theory (Year: 2010).*
Robust Inter-Vehicle Distance Estimation Method Based on Monocular Vision (Year: 2019).*
Japanese Notice of Reasons for Refusal issued in corresponding Japanese Patent Application No. 2019-160293, dated Apr. 13, 2021, with English translation.
Japanese Notice of Reasons for Refusal issued in corresponding Japanese Patent Application No. 2019-160293, dated Sep. 8, 2020, with English translation.

* cited by examiner

VEHICLE EXTERIOR ENVIRONMENT DETECTION APPARATUS

CROSS-REFERENCE TO RELATED APPLICATIONS

The present application claims priority from Japanese Patent Application No. 2019-043516 filed on Mar. 11, 2019 and Japanese Patent Application No. 2019-160293 filed on Sep. 3, 2019, the entire contents of each of which are hereby incorporated by reference.

BACKGROUND

The technology relates to a vehicle exterior environment detection apparatus that detects a vehicle around an own vehicle.

There are some vehicles such as automobiles each of which detects a vehicle around an own vehicle and controls, for example, traveling of the own vehicle depending on a result obtained by the detection. For example, Japanese Unexamined Patent Application Publication No. 2008-123462 discloses a technique that detects a vehicle around an own vehicle using a stereo camera, and calculates, on the basis of a width of the relevant vehicle, a relative speed between a traveling speed of the own vehicle and a traveling speed of the relevant vehicle.

SUMMARY

An aspect of the technology provides a vehicle exterior environment detection apparatus that includes an image width calculator, a predicted distance calculator, and a relative distance calculator. The image width calculator is configured to calculate a first image width of a target vehicle on the basis of a first image. The first image is one of a left image and a right image. The predicted distance calculator is configured to calculate a first predicted distance to the target vehicle on the basis of the first image width. The relative distance calculator is configured to calculate a first reliability of the first image width, and, when the first reliability is higher than a predetermined threshold, configured to calculate a first real width of the target vehicle on the basis of the first image width and the first predicted distance, update a smoothed real width by performing smoothing processing on the basis of the first real width, and calculate a first distance to the target vehicle on the basis of the smoothed real width and the first image width.

An aspect of the technology provides a vehicle exterior environment detection apparatus including circuitry. The circuitry is configured to calculate a first image width of a target vehicle on the basis of a first image, the first image being one of a left image and a right image, calculate a first predicted distance to the target vehicle on the basis of the first image width, calculate a first reliability of the first image width, and determine whether the first reliability is higher than a predetermined threshold. When the first reliability is higher than a predetermined threshold, the circuitry is configured to calculate a first real width of the target vehicle on the basis of the first image width and the first predicted distance, update a smoothed real width by performing smoothing processing on the basis of the first real width, and calculate a first distance to the target vehicle on the basis of the smoothed real width and the first image width.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

In processing of detecting a vehicle around an own vehicle, it is desired that detection accuracy be high, and a further improvement in the detection accuracy is expected.

It is desirable to provide a vehicle exterior environment detection apparatus that is able to enhance accuracy of detecting a vehicle.

Example Embodiment

Configuration Example

Figure 1:
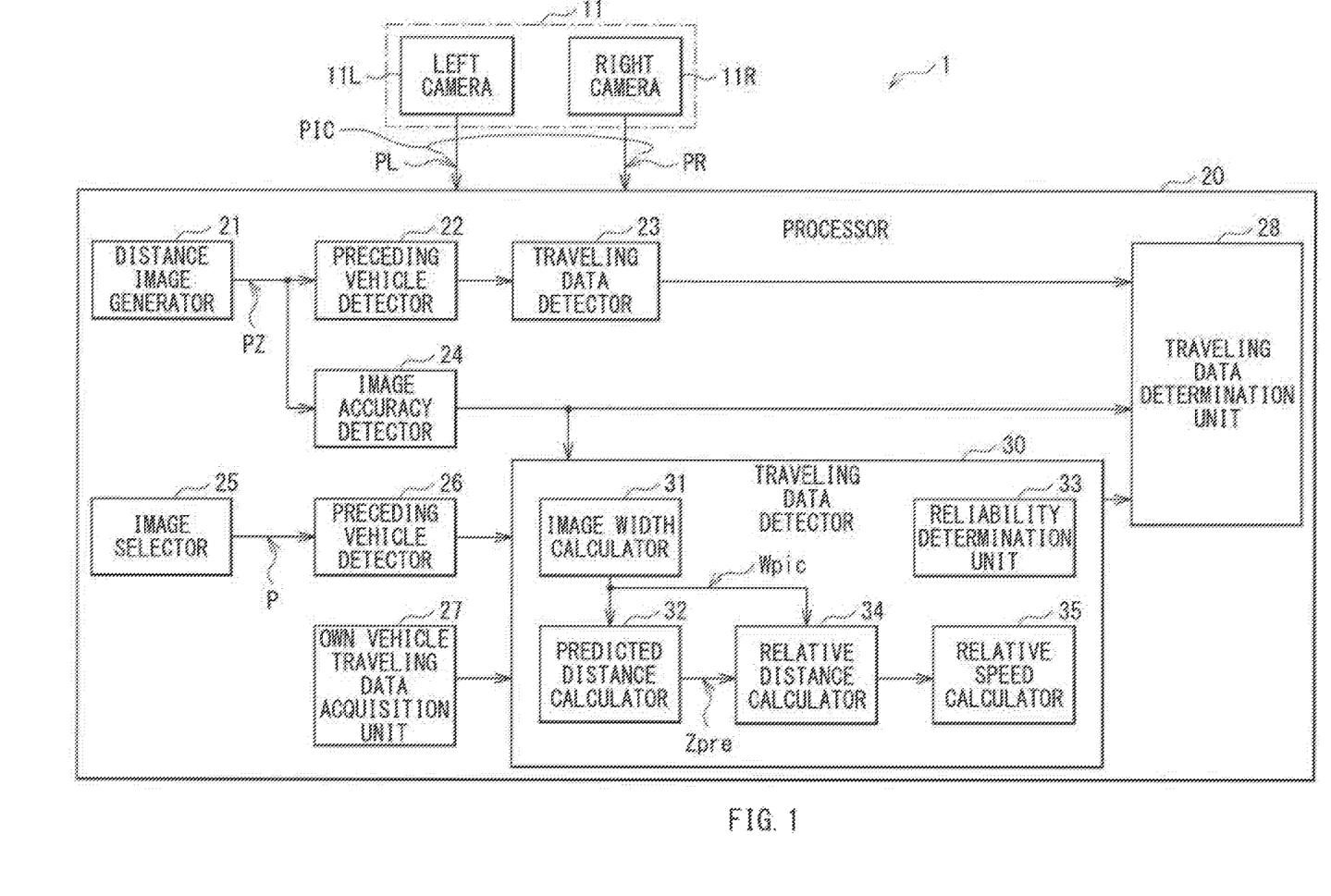
FIG. 1 is a block diagram illustrating a configuration example of a vehicle exterior environment detection apparatus according to one example embodiment of the technology.

FIG. 1 illustrates a configuration example of a vehicle exterior environment detection apparatus 1 according to an example embodiment. In one embodiment, the vehicle exterior environment detection apparatus 1 may serve as a "vehicle exterior environment detection apparatus". The vehicle exterior environment detection apparatus 1 may include a stereo camera 11 and a processor 20. The vehicle exterior environment detection apparatus 1 may be mounted on a vehicle 10 such as an automobile.

The stereo camera 11 may capture an image ahead of the vehicle 10 to thereby generate a pair of images (a left image PL and a right image PR) each having a parallax with respect to each other. The stereo camera 11 may have a left camera 11L and a right camera 11R. In this example, the left camera 11L and a right camera 11R may be disposed in the vicinity of a rearview mirror of the vehicle 10 and separated away from each other by a predetermined distance in a width direction of the vehicle 10. The left camera 11L and the right camera 11R may perform an imaging operation synchronously. The left camera 11L may generate the left image PL, and the right camera 11R may generate the right image PR. The left image PL and the right image PR may form a stereo image PIC. The stereo camera 11 may perform the imaging operation at a predetermined frame rate (for example, 60 [fps]) to thereby generate a series of stereo images PIC.

Figure 2A:
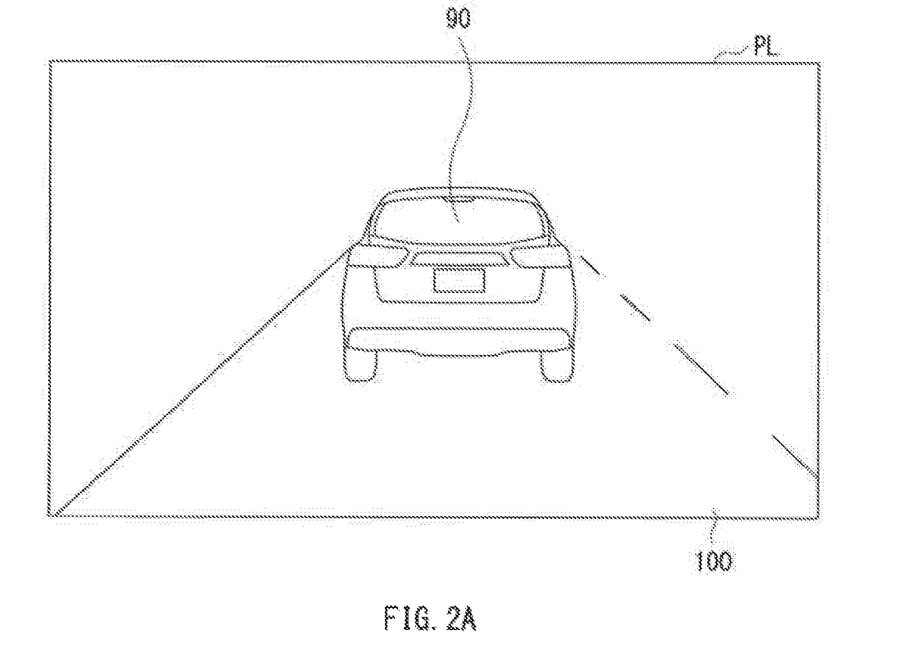
FIG. 2A is an image diagram illustrating an example of a left image generated by a left camera illustrated in FIG. 1.
Figure 2B:
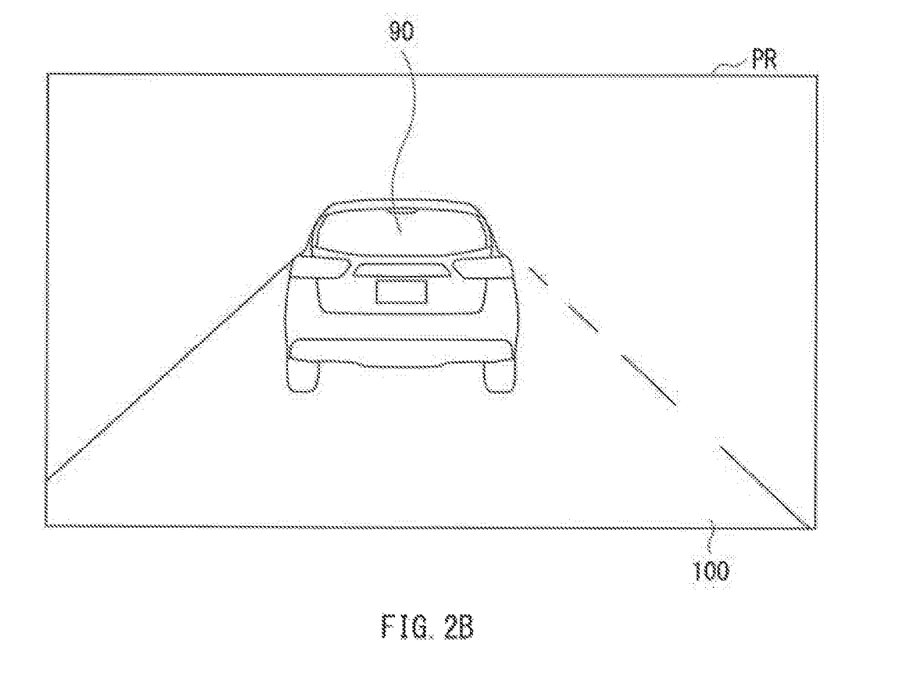
FIG. 2B is an image diagram illustrating an example of a right image generated by a right camera illustrated in FIG. 1.

FIG. 2A illustrates an example of the left image PL, and FIG. 2B illustrates an example of the right image PR. In this example, another vehicle, i.e., a preceding vehicle 90, is traveling ahead of the vehicle 10 on a road on which the vehicle 10 is traveling. The left camera 11L may capture an image of the preceding vehicle 90 to thereby generate the left image PL, and the right camera 11R may capture an image of the preceding vehicle 90 to thereby generate the right image PR. As a result, the left image PL and the right image PR may each have a parallax with respect to each other. The stereo camera 11 may generate the stereo image PIC including the left image PL and the right image PR.

The processor 20 (illustrated in FIG. 1) may detect traveling data of the preceding vehicle 90 on the basis of the stereo image PIC supplied by the stereo camera 11. The traveling data of the preceding vehicle 90 may include, for example, a relative distance from the vehicle 10 to the preceding vehicle 90, and a relative speed between a traveling speed of the vehicle 10 and a traveling speed of the preceding vehicle 90. The vehicle 10 may perform, for example, traveling controls such as an adaptive cruise control and a steering-assisting control on the basis of the traveling data of the preceding vehicle 90 obtained by the processor 20. The processor 20 may include, for example, a central processing unit (CPU) that executes programs, a random access memory (RAM) that temporarily stores processing data, and a read only memory (ROM) that stores programs. The processor 20 may include a distance image generator 21, a preceding vehicle detector 22, a traveling data detector 23, an image accuracy detector 24, an image selector 25, a preceding vehicle detector 26, an own vehicle traveling data acquisition unit 27, a traveling data detector 30, and a traveling data determination unit 28.

The distance image generator 21 may perform predetermined image processing including stereo matching processing and filtering processing on the basis of the left image PL and the right image PR included in the stereo image PIC, to thereby generate a distance image PZ. A pixel value of each pixel in the distance image PZ may be a depth value in a three-dimensional real space, which indicates a distance to a point corresponding to the relevant pixel. The distance image generator 21 may supply the preceding vehicle detector 22 with the generated distance image PZ.

The preceding vehicle detector 22 may detect the preceding vehicle 90 on the basis of the distance image PZ. In the distance image PZ, depth values in an image region corresponding to the preceding vehicle 90 may be smaller than depth values in an image region other than the image region corresponding to the preceding vehicle 90. The preceding vehicle detector 22 may detect the preceding vehicle 90 by using such depth values included in the distance image PZ.

Figure 3:
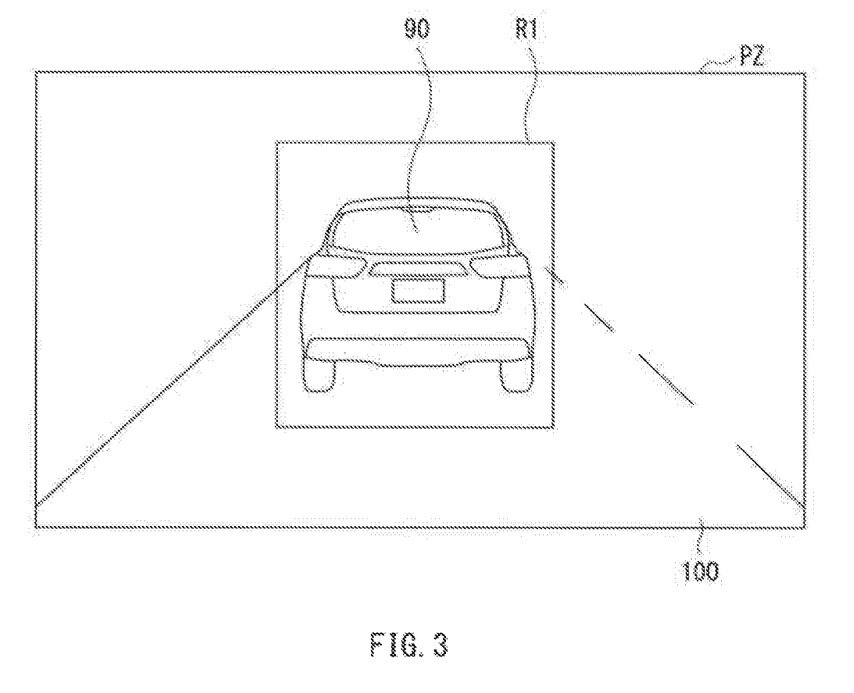
FIG. 3 is an image diagram schematically illustrating an operation example of a preceding vehicle detector illustrated in FIG. 1.

FIG. 3 schematically illustrates an example of a detection result obtained by the preceding vehicle detector 22. The preceding vehicle detector 22 may detect the preceding vehicle 90 on the basis of the distance image PZ. Further, the preceding vehicle detector 22 may identify a position of the preceding vehicle 90 in the distance image PZ as indicated by a region R1.

The traveling data detector 23 (illustrated in FIG. 1) may obtain, on the basis of the distance image PZ, traveling data of the preceding vehicle 90 detected by the preceding vehicle detector 22. The traveling data detector 23 may obtain the traveling data of the preceding vehicle 90 by using the depth values in the image region corresponding to the preceding vehicle 90 included in the distance image PZ.

The image accuracy detector 24 may detect image accuracy of the distance image PZ. One reason for detecting the image accuracy may be as follows. The distance image generator 21 may generate the distance image PZ on the basis of the left image PL and the right image PR; and therefore, in a case where either one of the left image PL and the right image PR is unclear due to raindrops or backlight, for example, the image accuracy of the distance image PZ may decrease. In this case, there is a possibility that the position of the preceding vehicle 90 detected by the preceding vehicle detector 22 and the traveling data obtained by the traveling data detector 23 can be inaccurate. Accordingly, the image accuracy detector 24 may detect the image accuracy of the distance image PZ on the basis of the distance image PZ. Further, the image accuracy detector 24 may supply the traveling data detector 30 and the traveling data determination unit 28 with data related to the detection result.

The image selector 25 may select either one of the left image PL and the right image PR. In one example, the image selector 25 may evaluate, by using a machine learning technique, a certainty that the preceding vehicle 90 is a vehicle on the basis of each of an image corresponding to the preceding vehicle 90 in the left image PL and an image corresponding to the preceding vehicle 90 in the right image PR, to thereby generate respective scores of the left image PL and the right image PR. The image selector 25 may select, as an image P, an image whose score is higher among the left image PL and the right image PR, and supply the preceding vehicle detector 26 with the selected image P.

The preceding vehicle detector 26 may detect the preceding vehicle 90 on the basis of the image P. The preceding vehicle detector 26 may have, in this example, a plurality of detection modes M for detecting the preceding vehicle 90. The preceding vehicle detector 26 may select one of the detection modes M on the basis of an environment condition, for example, and detect the preceding vehicle 90 using the selected detection mode M.

In one example, under a condition in which the body of the preceding vehicle 90 is easily detected, such as during daytime hours, the preceding vehicle detector 26 may select a detection mode M1 among the detection modes M. In the detection mode M1, the preceding vehicle detector 26 may search for the preceding vehicle 90 on the basis of the image P using a machine learning technique, to thereby detect the preceding vehicle 90.

Figure 4:
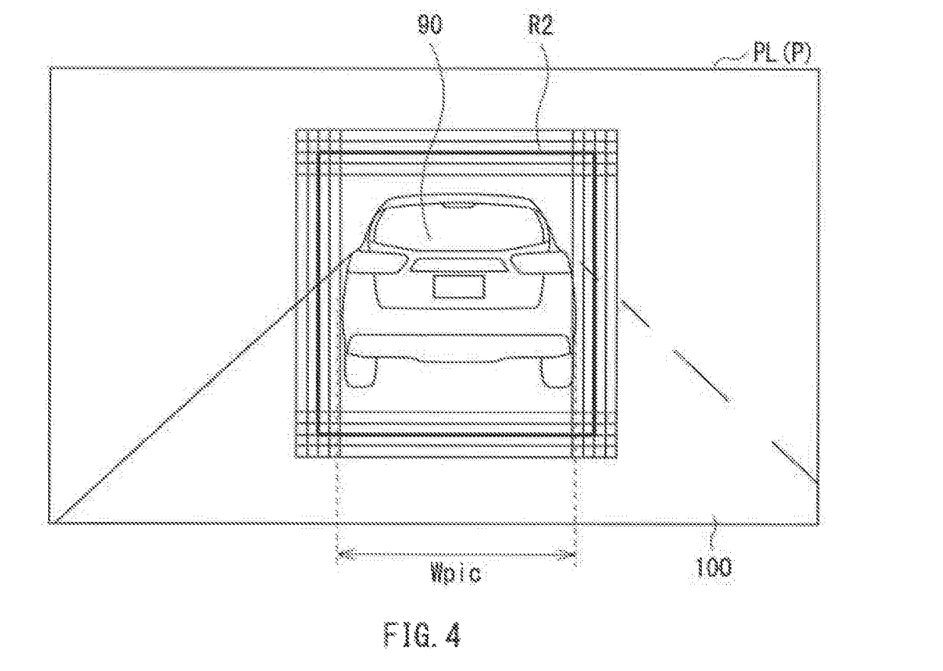
FIG. 4 is an image diagram schematically illustrating an operation example of another preceding vehicle detector illustrated in FIG. 1.

FIG. 4 schematically illustrates an example of processing in the detection mode M1 performed by the preceding vehicle detector 26. The preceding vehicle detector 26 may search for the preceding vehicle 90 by sequentially setting processing target regions R2, slightly changing the positions of the processing target regions R2 each time. The preceding vehicle detector 26 may confirm whether the preceding vehicle 90 exists in each processing target region R2 using a machine learning technique. In this way, the preceding vehicle detector 26 may identify the position of the preceding vehicle 90 in the image P.

Further, for example, under a condition in which it is difficult to detect the body of the preceding vehicle 90, such as during nighttime hours, the preceding vehicle detector 26 may select a detection mode M2 among the detection modes M. In the detection mode M2, the preceding vehicle detector 26 may detect taillights of the preceding vehicle 90 on the basis of the image P, to thereby detect the preceding vehicle 90.

Figure 5:
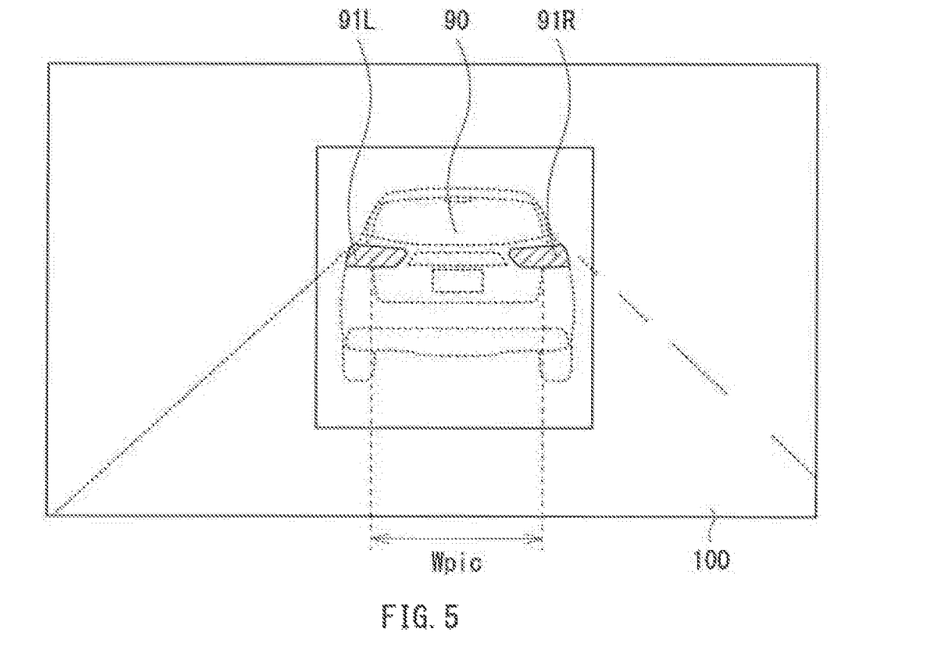
FIG. 5 is an image diagram schematically illustrating another operation example of the other preceding vehicle detector illustrated in FIG. 1.

FIG. 5 schematically illustrates an example of processing in the detection mode M2 performed by the preceding vehicle detector 26. During nighttime hours, the preceding vehicle 90 may travel with outputting light from a left taillight 91L and a right taillight 91R. Accordingly, even under a condition in which it is difficult to detect the body of the preceding vehicle 90, it is possible for the preceding vehicle detector 26 to detect the left taillight 91L and the right taillight 91R. The preceding vehicle detector 26 may detect the left taillight 91L and the right taillight 91R in the image P to thereby identify the position of the preceding vehicle 90 in the image P.

The own vehicle traveling data acquisition unit 27 (illustrated in FIG. 1) may acquire traveling data of the vehicle 10 that is an own vehicle on which the vehicle exterior environment detection apparatus 1 is mounted, on the basis of a detection signal from an unillustrated sensor included in the vehicle 10 or a control signal from an unillustrated control device included in the vehicle 10. The traveling data of the vehicle 10 may include data related to a traveling speed V10 of the vehicle 10, a yaw rate of the vehicle 10, a movement amount in a vehicle-width direction (x-direction) of the vehicle 10, a movement amount in a vehicle-length direction (z-direction) of the vehicle 10, etc.

The traveling data detector 30 may obtain, on the basis of the image P, traveling data of the preceding vehicle 90 detected by the preceding vehicle detector 26. In one example, the traveling data detector 30 may calculate an image width Wpic of the preceding vehicle 90 in the image P, and, on the basis of a size of the image width Wpic, may calculate a relative speed V between a traveling speed of the vehicle 10 and a traveling speed of the preceding vehicle 90 and a relative distance Z to the preceding vehicle 90, to thereby obtain the traveling data of the preceding vehicle 90. That is, for example, in a case where a distance between the vehicle 10 and the preceding vehicle 90 is small, the image width Wpic of the preceding vehicle 90 in the image P is large, and in a case where the distance between the vehicle 10 and the preceding vehicle 90 is large, the image width Wpic of the preceding vehicle 90 in the image P is small; therefore, the traveling data detector 30 is able to obtain the traveling data of the preceding vehicle 90 by using such an image size (scaling) of the preceding vehicle 90 in the image P. The traveling data detector 30 may include an image width calculator 31, a predicted distance calculator 32, a reliability determination unit 33, a relative distance calculator 34, and a relative speed calculator 35.

The image width calculator 31 calculates the image width Wpic of the preceding vehicle 90 on the basis of the image P. For example, under a condition in which the body of the preceding vehicle 90 is easily detected, such as during daytime hours, the image width calculator 31 may calculate, as illustrated in FIG. 4, a vehicle width of the preceding vehicle 90 in the image P as the image width Wpic. Further, for example, under a condition in which it is difficult to detect the body of the preceding vehicle 90, such as during nighttime hours, the image width calculator 31 may calculate, as illustrated in FIG. 5, a distance between the center of the left taillight 91L and the center of the right taillight 91R in the image P as the image width Wpic.

The predicted distance calculator 32 calculates a predicted relative distance Zpre to the preceding vehicle 90 on the basis of the image width Wpic calculated by the image width calculator 31. The predicted distance calculator 32 may calculate a predicted relative distance Zpre to the preceding vehicle 90 on the basis of the image width Wpic calculated by the image width calculator 31 and the traveling data of the vehicle 10 supplied by the own vehicle traveling data acquisition unit 27.

The reliability determination unit 33 evaluates a reliability of the image width Wpic calculated by the image width calculator 31. In one example, the reliability determination unit 33 calculates the reliability of the image width Wpic on the basis of the distance image PZ, and compares the calculated reliability of the image width Wpic with a predetermined threshold.

The relative distance calculator 34 calculates the relative distance Z on the basis of the image width Wpic calculated by the image width calculator 31 and the predicted relative distance Zpre calculated by the predicted distance calculator 32. In one example, in a case where the reliability of the image width Wpic calculated by the reliability determination unit 33 is higher than the predetermined threshold, the relative distance calculator 34 calculates an actual width (real width Wreal) corresponding to the image width Wpic of the preceding vehicle 90, on the basis of the predicted relative distance Zpre calculated by the predicted distance calculator 32 and the image width Wpic. Further, the relative distance calculator 34 updates a real width Wreal1 by performing smoothing processing on the basis of the real width Wreal. Moreover, the relative distance calculator 34 calculates the relative distance Z on the basis of the real width Wreal1 and the image width Wpic.

The relative speed calculator 35 may calculate the relative speed V on the basis of the relative distance Z calculated by the relative distance calculator 34.

In this way, the traveling data detector 30 is able to obtain the traveling data of the preceding vehicle 90 on the basis of the image P.

The traveling data determination unit 28 may determine the traveling data of the preceding vehicle 90 on the basis of, depending on a detection result obtained by the image accuracy detector 24, the traveling data of the preceding vehicle 90 based on the distance image PZ that is obtained by the traveling data detector 23 and the traveling data of the preceding vehicle 90 based on the image P that is obtained by the traveling data detector 30. In one example, in a case where the image accuracy of the distance image PZ is high, the traveling data determination unit 28 may determine the traveling data of the preceding vehicle 90 on the basis of the traveling data of the preceding vehicle 90 that is obtained by the traveling data detector 23 on the basis of the distance image PZ, and in a case where the image accuracy of the distance image PZ is low, the traveling data determination unit 28 may determine the traveling data of the preceding vehicle 90 on the basis of the traveling data of the preceding vehicle 90 that is obtained by the traveling data detector 30 on the basis of the image P.

With such a configuration, in the vehicle exterior environment detection apparatus 1, the traveling data detector 23 may continuously obtain the traveling data of the preceding vehicle 90 on the basis of a series of distance images PZ generated on the basis of the series of stereo images PIC, and the traveling data detector 30 may also continuously obtain the traveling data of the preceding vehicle 90 on the basis of a series of images P included in the series of stereo images PIC. At that time, in a case where either one of the left image PL and the right image PR becomes unclear due to raindrops, etc., and the image accuracy of the distance image PZ decreases, for example, the vehicle exterior environment detection apparatus 1 may determine the traveling data of the preceding vehicle 90 on the basis of the traveling data of the preceding vehicle 90 that is obtained on the basis of an image (image P), which is either one of the left image PL and the right image PR that has a higher certainty that the preceding vehicle 90 is a vehicle. In this way, the vehicle exterior environment detection apparatus 1 is able to enhance accuracy of detecting the preceding vehicle 90.

In one embodiment, the image width calculator 31 may serve as an "image width calculator". In one embodiment, the predicted distance calculator 32 may serve as a "predicted distance calculator". In one embodiment, the reliability determination unit 33 and the relative distance calculator 34 may serve as a "relative distance calculator". In one embodiment, the relative speed calculator 35 may serve as a "relative speed calculator". In one embodiment, the preceding vehicle 90 may serve as a "target vehicle".

Operations and Workings

Now, description will be given on operations and workings of the vehicle exterior environment detection apparatus 1 of the example embodiment.

Outline of Overall Operations

First, with reference to FIG. 1, an outline of overall operations of the vehicle exterior environment detection apparatus 1 will be described. The stereo camera 11 may capture an image ahead of the vehicle 10 to thereby generate the stereo image PIC including the left image PL and the right image PR each having a parallax with respect to each other. The distance image generator 21 may generate the distance image PZ on the basis of the left image PL and the right image PR included in the stereo image PIC. The preceding vehicle detector 22 may detect the preceding vehicle 90 on the basis of the distance image PZ. The traveling data detector 23 may obtain, on the basis of the distance image PZ, the traveling data of the preceding vehicle 90 detected by the preceding vehicle detector 22. The image accuracy detector 24 may detect the image accuracy of the distance image PZ. The image selector 25 may evaluate, by using a machine learning technique, the certainty that the preceding vehicle 90 is a vehicle on the basis of each of the left image PL and the right image PR, to thereby select one of the left image PL and the right image PR as the image P. The preceding vehicle detector 26 may detect the preceding vehicle 90 on the basis of the image P. The own vehicle traveling data acquisition unit 27 may acquire the traveling data of the vehicle 10 on the basis of a detection signal from an unillustrated sensor included in the vehicle 10 or a control signal from an unillustrated control device included in the vehicle 10. The traveling data detector 30 may obtain, on the basis of the image P, the traveling data of the preceding vehicle 90 detected by the preceding vehicle detector 26. The traveling data determination unit 28 may determine the traveling data of the preceding vehicle 90 on the basis of, depending on a detection result obtained by the image accuracy detector 24, the traveling data of the preceding vehicle 90 based on the distance image PZ that is obtained by the traveling data detector 23 and the traveling data of the preceding vehicle 90 based on the image P that is obtained by the traveling data detector 30.

Detailed Operations

Figure 6:
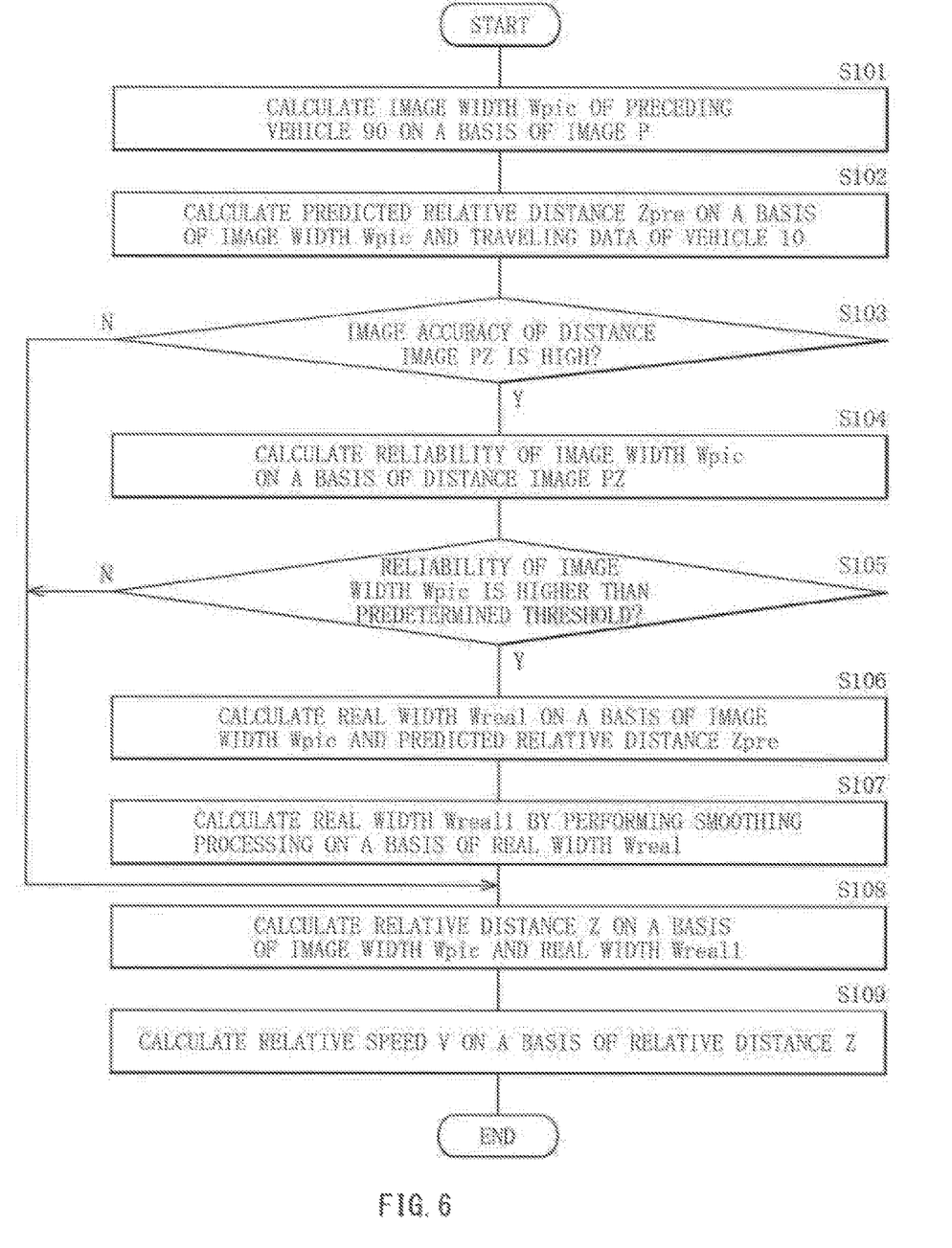
FIG. 6 is a flowchart illustrating an example of a traveling data detector illustrated in FIG. 1.

FIG. 6 illustrates an example of operations performed by the traveling data detector 30. The traveling data detector 30 may perform the following operations on each of a series of frames F.

First, the image width calculator 31 included in the traveling data detector 30 calculates the image width Wpic of the preceding vehicle 90 on the basis of the image P (step S101). For example, under a condition in which the body of the preceding vehicle 90 is easily detected, such as during daytime hours, the image width calculator 31 may calculate, as illustrated in FIG. 4, a vehicle width of the preceding vehicle 90 in the image P as the image width Wpic. Further, for example, under a condition in which it is difficult to detect the body of the preceding vehicle 90, such as during nighttime hours, the image width calculator 31 may calculate, as illustrated in FIG. 5, a distance between the center of the left taillight 91L and the center of the right taillight 91R in the image P as the image width Wpic.

Thereafter, the predicted distance calculator 32 included in the traveling data detector 30 calculates a predicted relative distance Zpre to the preceding vehicle 90 on the basis of the image width Wpic calculated in step S101. The predicted distance calculator 32 may calculate a predicted relative distance Zpre to the preceding vehicle 90 on the basis of the image width Wpic calculated in step S101 and the traveling data of the vehicle 10 supplied by the own vehicle traveling data acquisition unit 27 (step S102).

In one example, the predicted distance calculator 32 may calculate, on the basis of the image width Wpic, a predicted relative speed Vpre between the traveling speed of the vehicle 10 and the traveling speed of the preceding vehicle 90 by using the following Equation (1) and the image size (scaling) of the preceding vehicle 90.

$$Vpre(n) = \frac{Wpic(n-1) - Wpic(n)}{Wpic(n)} \cdot \frac{Z(n-1)}{\Delta t} \quad (1)$$

Where: Vpre(n) represents a predicted relative speed regarding an n-th frame F; Wpic(n) represents an image width obtained from an image P regarding the n-th frame F, and Wpic(n−1) represents an image width obtained from an image P regarding an (n−1)th frame F; Z(n−1) represents a relative distance regarding the (n−1)th frame F; and Δt represents a reciprocal of a frame rate, and, for example, in a case where the frame rate is 60 [fps], Δt is 16.7 [msec] (=1/60).

Thereafter, the predicted distance calculator 32 may calculate a predicted traveling speed V90pre of the preceding vehicle 90 on the basis of the predicted relative speed Vpre and on the basis of the traveling speed V10 of the vehicle 10 supplied by the own vehicle traveling data acquisition unit 27, by using the following Equation (2).

$$V90\text{pre}(n) = V10(n) + V\text{pre}(n) \quad (2)$$

Where: V90pre(n) represents a predicted traveling speed of the preceding vehicle 90 regarding the n-th frame F; and V10(n) represents a traveling speed of the vehicle 10 regarding the n-th frame F.

Further, the predicted distance calculator 32 may calculate the predicted relative distance Zpre to the preceding vehicle 90 on the basis of: a predicted traveling speed V90pre(n−1) of the preceding vehicle 90 regarding the (n−1)th frame F; a relative distance Z(n−1) regarding the (n−1)th frame F; a movement amount of the vehicle 10 in the vehicle-width direction (x-direction) of the vehicle 10 at time Δt; a movement amount of the vehicle 10 in the vehicle-length direction (z-direction) of the vehicle 10 at time Δt; a yaw rate of the vehicle 10; etc.

In this way, the predicted distance calculator 32 may calculate the predicted relative distance Zpre.

Thereafter, the traveling data detector 30 may confirm the image accuracy of the distance image PZ on the basis of a detection result obtained by the image accuracy detector 24 (step S103). In a case where the image accuracy of the distance image PZ is low ("N" in step S103), the processing may proceed to step S108.

In a case where the image accuracy of the distance image PZ is high in step S103 ("Y" in step S103), the reliability determination unit 33 calculates the reliability of the image width Wpic calculated in step S101 (step S104), and compares the calculated reliability with the predetermined threshold (step S105).

In one example, in a case where the preceding vehicle detector 26 operates in the detection mode M2, the reliability determination unit 33 may calculate, on the basis of the distance image PZ, a parameter related to the left taillight 91L and a parameter related to the right taillight 91R, and calculate a difference between those parameters, to thereby calculate the reliability. In one example, the reliability determination unit 33 may detect: a difference between a relative distance to the left taillight 91L and a relative distance to the right taillight 91R; a difference between the area of the left taillight 91L and the area of the right taillight 91R; a difference between a height of a position of the left taillight 91L and a height of a position of the right taillight 91R; a difference between a width of the left taillight 91L and a width of the right taillight 91R; and a difference between a vertical length of the left taillight 91L and a vertical length of the right taillight 91R. Thereafter, the reliability determination unit 33 may calculate the reliability of the image width Wpic on the basis of those five differences. With decrease in the value of each of the five differences, the reliability of the image width Wpic may increase. In other words, the reliability determination unit 33 may calculate the reliability of the image width Wpic by evaluating whether the vehicle 10 is located at a position right behind the preceding vehicle 90 and around the relevant position. For example, the reliability of the image width Wpic may increase as the vehicle 10 comes closer to the position right behind the preceding vehicle 90. Thereafter, the reliability determination unit 33 compares the calculated reliability of the image width Wpic with the predetermined threshold.

For example, in a case where the preceding vehicle 90 travels diagonally in front of the vehicle 10, the difference between the relative distance to the left taillight 91L and the relative distance to the right taillight 91R, for example, becomes large; therefore, the preceding vehicle detector 26 may determine that the reliability of the image width Wpic is low. That is, in the a where the preceding vehicle 90 travels diagonally in front of the vehicle 10 as in this case, the distance between the center of the left taillight 91L and the center of the right taillight 91R indicated by the image width Wpic calculated in step S101 is apparently smaller than an actual distance; therefore, the image width Wpic can take an inaccurate value. Accordingly, the reliability determination unit 33 may determine that the reliability of the image width Wpic is low.

In step S105, in a case where the reliability of the image width Wpic is lower than the predetermined threshold ("N" in step S105), the processing may proceed to step S108.

In step S105, in a case where the reliability of the image width Wpic is higher than the predetermined threshold ("Y" in step S105), the relative distance calculator 34 calculates the actual width (real width Wreal) corresponding to the image width Wpic of the preceding vehicle 90 on the basis of the image width Wpic calculated in step S101 and the predicted relative distance Zpre calculated in step S102 (step S106). This calculation may utilize a known calculation method using the image size (scaling) of the preceding vehicle 90, for example.

Thereafter, the relative distance calculator 34 updates a real width Wreal1 by performing smoothing processing on the basis of the real width Wreal calculated in step S106 (step S107). That is, a series of real widths Wreal may be sequentially calculated in step S106 on the basis of a series of images P; therefore, the relative distance calculator 34 may perform the smoothing processing on the basis of the series of real widths Wreal every time the real width Wreal is calculated in step S106, to thereby update the real width Wreal1. In one example, the relative distance calculator 34 may perform the smoothing processing by using the following Equation (3).

$$Wreal1(n) = \frac{Wreal1(n-1) \times Areal1 + Wreal(n) \times Areal}{Areal1 + Areal} \quad (3)$$

Where: Wreal1(n) represents a real width after the smoothing processing regarding the n-th frame F; Wreal1(n−1) represents a real width after the smoothing processing regarding the (n−1)th frame F; Wreal(n) represents a real width before the smoothing processing regarding the n-th frame F; Areal1 represents a weighting coefficient for the real width Wreal1(n−1) after the smoothing processing; and Areal represents a weighting coefficient for the real width Wreal(n) before the smoothing processing. The weighting coefficient Areal1 is a coefficient that varies, gradually increases as the number of times the smoothing processing is performed increases, and is set to reach a predetermined upper limit in the end. Thus, in a case where the number of times the smoothing processing is performed is small, the value of the real width Wreal1 can go up and down and fluctuate; however, as the number of times the smoothing processing is performed increases to a certain extent, the value of the real width Wreal1 is smoothed and prevented from deviating largely from the last value. In this way, the relative distance calculator 34 may perform the smoothing processing to thereby update the real width Wreal1.

Thereafter, the relative distance calculator 34 calculates the relative distance Z on the basis of the image width Wpic calculated in step S101 and the real width Wreal1 calculated by the smoothing processing in step S107 (step S108). This calculation may utilize a known calculation method using the image size (scaling) of the preceding vehicle 90, for example. For example, in a case where the processing proceeds directly from step S103 or step S105 to step S108 ("N" in step S103 or S105), the real width Wreal1 may not necessarily be updated in step S107. Accordingly, the relative distance calculator 34 may calculate the relative distance Z on the basis of the image width Wpic calculated in step S101 and the latest real width Wreal1 that has been updated in the past.

Thereafter, the relative speed calculator 35 may calculate the relative speed V on the basis of the relative distance Z calculated in step S108 (step S109). In one example, the relative speed calculator 35 may calculate the relative speed V on the basis of the relative distance Z by using the following Equation (4).

$$V(n) = \frac{Z(n) - Z(n-1)}{\Delta t} \qquad (4)$$

Where: $Z(n)$ represents a relative distance regarding the n-th frame F; and $Z(n-1)$ represents a relative distance regarding the (n−1)th frame F. The traveling data detector 30 may calculate a traveling speed V90 of the preceding vehicle 90 on the basis of the relative speed V, by using the following Equation (5).

$$V90(n) = V10(n) + V(n) \qquad (5)$$

Where V90(n) represents a traveling speed of the preceding vehicle 90 regarding the n-th frame F.

This may be the end of this flow.

In this way, the vehicle exterior environment detection apparatus 1 may obtain the traveling data of the preceding vehicle 90 on the basis of the distance image PZ and may also detect the traveling data of the preceding vehicle 90 on the basis of the image P, and is therefore able to enhance accuracy of detecting the preceding vehicle 90. That is, in a case where either one of the left image PL and the right image PR is unclear due to raindrops or backlight, for example, the image accuracy of the distance image PZ can decrease, and as a result, there is a possibility that the accuracy of the traveling data of the preceding vehicle 90 detected on the basis of the distance image PZ can be low. However, the vehicle exterior environment detection apparatus 1 may obtain the traveling data of the preceding vehicle 90 on the basis of the distance image PZ and may also obtain the traveling data of the preceding vehicle 90 on the basis of the image P. Therefore, even in the case where either one of the left image PL and the right image PR is unclear as mentioned above, the vehicle exterior environment detection apparatus 1 is able to obtain the traveling data of the preceding vehicle 90 on the basis of the image (image P) which is the clearer one of the left image PL and the right image PR. Thus, it is possible to enhance the accuracy of detecting the preceding vehicle 90.

Further, in the vehicle exterior environment detection apparatus 1, the reliability determination unit 33 included in the traveling data detector 30 calculates the reliability of the image width Wpic. In a case where the reliability is higher than the predetermined threshold, the relative distance calculator 34 calculates the real width Wreal on the basis of the image width Wpic and the predicted relative distance Zpre, updates the real width Wreal1 by performing smoothing processing on the basis of the real width Wreal, and calculates the relative distance Z on the basis of the real width Wreal1 and the image width Wpic. With this configuration, the vehicle exterior environment detection apparatus 1 is able to enhance accuracy of the relative distance Z as described below.

Figure 7A:
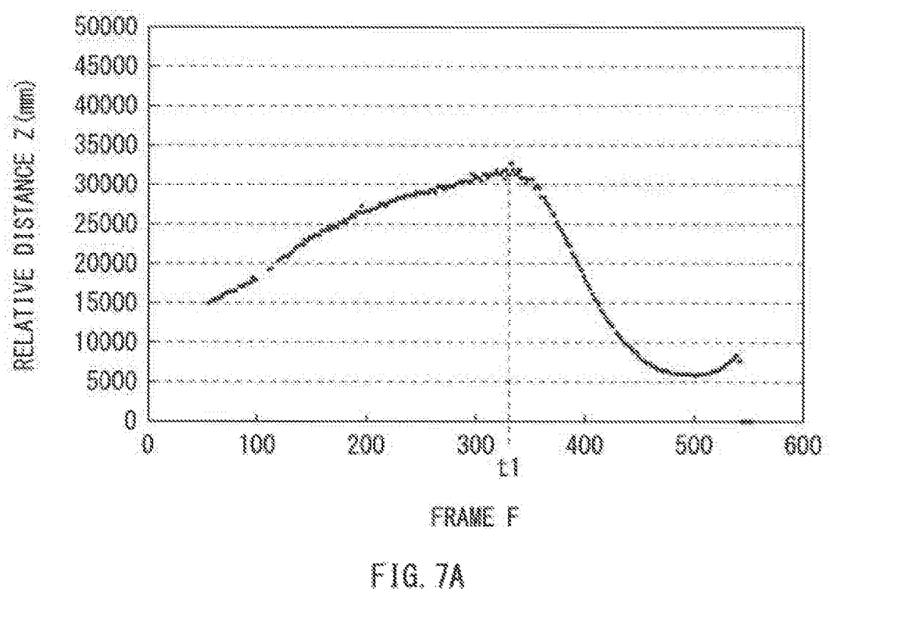
FIG. 7A is a characteristic diagram illustrating an example of a relative distance.
Figure 7B:
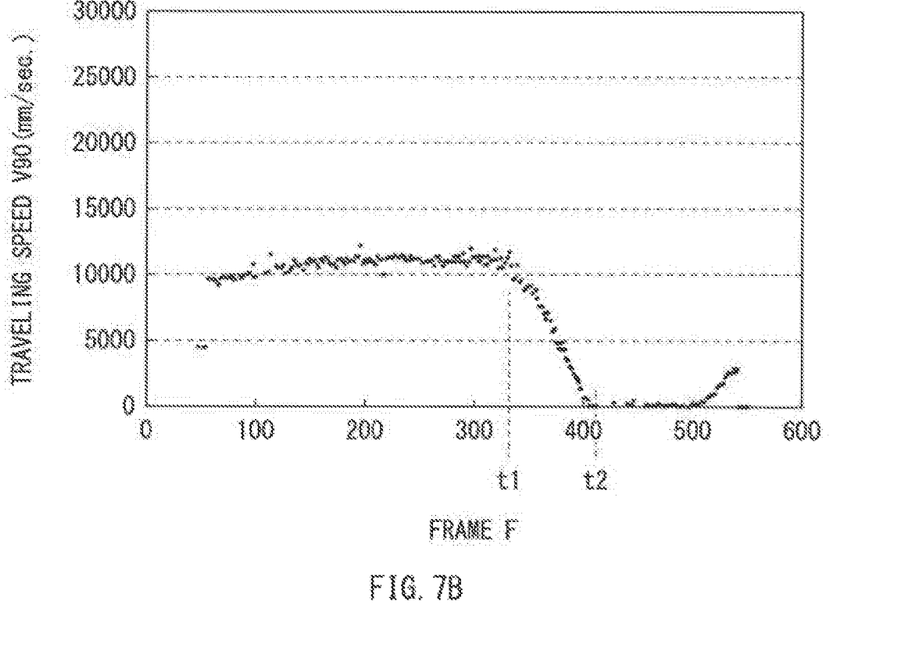
FIG. 7B is a characteristic diagram illustrating an example of a traveling speed of a preceding vehicle.

FIG. 7A illustrates an example of a series of relative distances Z calculated by the traveling data detector 30, and FIG. 7B illustrates an example of the traveling speed V90 of the preceding vehicle 90 calculated by the traveling data detector 30. In this example, as illustrated in FIG. 7B, the preceding vehicle 90 is traveling at an approximately constant speed during a time period before timing t1. The vehicle 10 is traveling at a traveling speed lower than the traveling speed of the preceding vehicle 90, and, as illustrated in FIG. 7A, the relative distance Z gradually increases as the time elapses. Thereafter, as illustrated in FIG. 7B, the preceding vehicle 90 starts to deaccelerate at timing t1. In response to this, as illustrated in FIG. 7A, the relative distance Z starts to decrease at timing t1. Thereafter, the preceding vehicle 90 stops at timing t2.

Figure 8A:
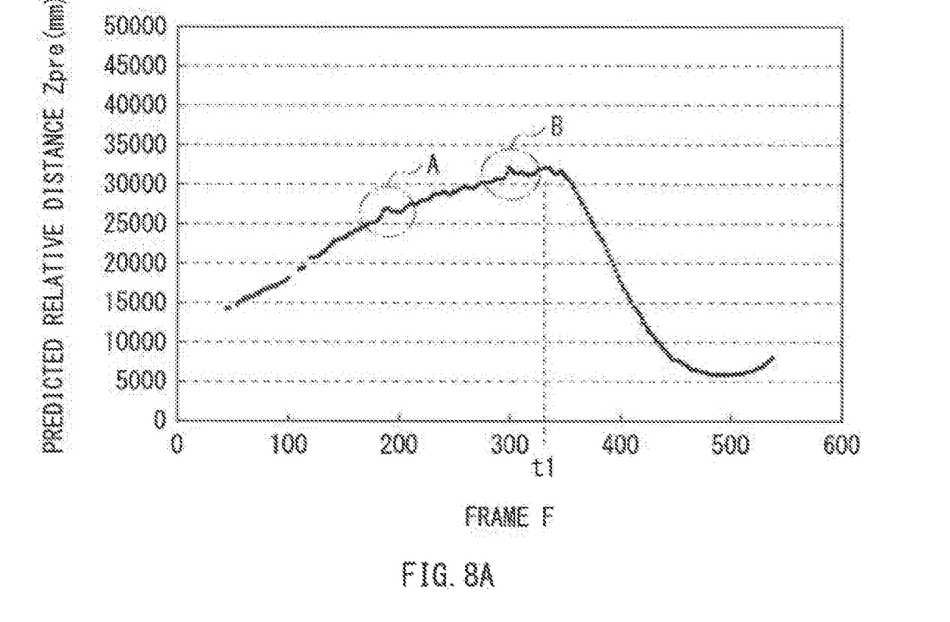
FIG. 8A is a characteristic diagram illustrating an example of a predicted relative distance.
Figure 8B:
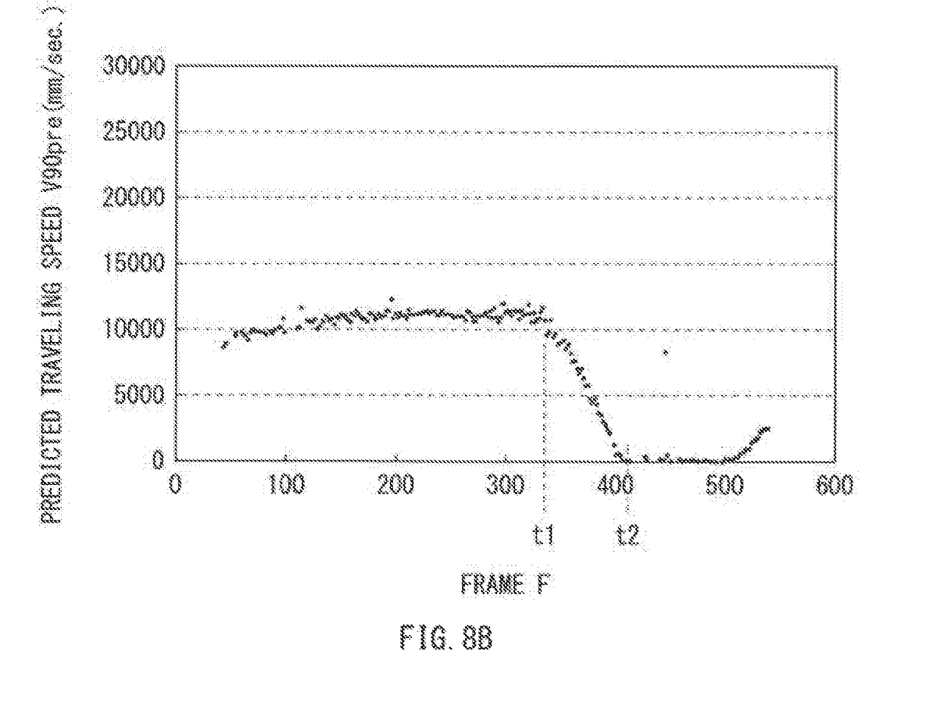
FIG. 8B is a characteristic diagram illustrating an example of a predicted traveling speed of a preceding vehicle.

FIG. 8A illustrates an example of a series of predicted relative distances Zpre, and FIG. 8B illustrates an example of the predicted traveling speed V90pre of the preceding vehicle 90. The predicted relative distance Zpre illustrated in FIG. 8A is similar to the relative distance Z illustrated in FIG. 7A, and the predicted traveling speed V90pre illustrated in FIG. 8B is similar to the traveling speed V90 illustrated in FIG. 7B. The predicted relative distance Zpre (FIG. 8A) differs from the relative distance Z (FIG. 7A) in that, for example, fluctuations occur in parts A and B. The fluctuations in the predicted relative distance Zpre are each attributed to a fluctuation in the predicted relative speed Vpre at the time of calculating the predicted relative speed Vpre on the basis of the image width Wpic by using Equation (1). The traveling data detector 30 may perform, on the basis of such a predicted relative speed Vpre, the calculations indicated in steps S103 to S108 illustrated in FIG. 6, to thereby prevent the fluctuations like the fluctuations in predicted relative distance Zpre (FIG. 8A) from occurring in the relative distance Z (FIG. 7A).

That is, in the vehicle exterior environment detection apparatus 1, as illustrated in FIG. 6, in a case where the reliability of the image width Wpic is higher than the predetermined threshold ("Y" in step S105), the relative distance calculator 34 calculates the real width Wreal on the basis of the image width Wpic and the predicted relative distance Zpre, updates the real width Wreal1 by performing the smoothing processing on the basis of the real width Wreal, and calculates the relative distance Z on the basis of the real width Wreal1 and the image width Wpic. Further, in a case where the reliability of the image width Wpic is lower than the predetermined threshold ("N" in step S105), the vehicle exterior environment detection apparatus 1 may not necessarily update the real width Wreal1 and may calculate the relative distance Z on the basis of the image width Wpic and the latest real width Wreal1 that has been updated in the past. For example, in a case where the reliability of the image width Wpic is low, the predicted relative speed Vpre can fluctuate. In the vehicle exterior environment detection apparatus 1, the real width Wreal1 may not necessarily be updated in a case where the reliability of the image width Wpic is low; therefore, it is possible to reduce the possibility that the image width Wpic that causes the predicted relative speed Vpre to fluctuate influences the real width Wreal1. In this manner, the vehicle exterior environment detection apparatus 1 is able to prevent the fluctuations like the fluctuations in predicted relative distances Zpre (FIG. 8A) from occurring in the relative distances Z (FIG. 7A). As a result, the vehicle exterior environment detection apparatus 1 is able to enhance accuracy of detecting the preceding vehicle 90.

Further, in the vehicle exterior environment detection apparatus 1, the relative distance calculator 34 included in the traveling data detector 30 updates the real width Wreal1 by performing the smoothing processing on the basis of the real width Wreal, and calculates the relative distance Z on the basis of the real width Wreal1 and the image width Wpic. Accordingly, in the vehicle exterior environment detection apparatus 1, even in a case where fluctuations in the real widths Wreal occur, the fluctuations are suppressed by performing the smoothing processing; therefore, it is possible to suppress the fluctuations in the relative distances Z. As a result, the vehicle exterior environment detection apparatus 1 is able to enhance accuracy of detecting the preceding vehicle 90.

Example Effects

As described above, in the example embodiment, in a case where the reliability of the image width is higher than the predetermined threshold, the real width Wreal is calculated on the basis of the image width and the predicted relative distance, the real width Wreal1 is updated by performing the smoothing processing on the basis of the real width Wreal, and the relative distance is calculated on the basis of the real width Wreal1 and the image width. Therefore, it is possible to reduce the possibility that the image width that causes the predicted relative speed to fluctuate influences the real width Wreal1. Thus, it is possible to enhance the accuracy of detecting the preceding vehicle.

In the example embodiment, the real width Wreal1 is updated by performing the smoothing processing on the basis of the real width Wreal, and the relative distance is calculated on the basis of the real width Wreal1 and the image width. Therefore, even in a case where fluctuations in the real widths Wreal occur, the fluctuations are suppressed by performing the smoothing processing. Thus, it is possible to enhance the accuracy of detecting the preceding vehicle.

Although some example embodiments of the technology have been described in the foregoing, the technology is by no means limited to the example embodiments. Various changes and modifications may be made to any embodiment without departing from the scope of the technology.

For example, although an example embodiment has been described above in which the preceding vehicle 90 traveling ahead of the vehicle 10 is regarded as the target of processing, the technology is not limited thereto. Alternatively, for example, a vehicle traveling behind the vehicle 10 may be regarded as the target of processing. In this case, the stereo camera 11 may capture an image behind the vehicle 10.

The example effects described above are merely illustrative and non-limiting. Any embodiment may achieve an effect other than the example effects described above.

The processor 20 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 20. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 20 illustrated in FIG. 1.

The invention claimed is:

1. A vehicle exterior environment detection apparatus comprising:
an image width calculator configured to calculate a first image width of a target vehicle on a basis of a first image, the first image being one of a left image and a right image;
a predicted distance calculator configured to calculate a first predicted distance to the target vehicle on a basis of the first image width; and
a relative distance calculator configured to calculate a first reliability of the first image width, and, when the first reliability is higher than a predetermined threshold, configured to
calculate a first real width of the target vehicle on a basis of the first image width and the first predicted distance,
update a smoothed real width by performing smoothing processing on a basis of the first real width, and
calculate a first distance to the target vehicle on a basis of the smoothed real width and the first image width, wherein
the image width calculator is configured to calculate a second image width of the target vehicle on a basis of a second image, the second image being one of the left image and the right image and being captured at a timing later than a timing at which the first image is captured,
the predicted distance calculator is configured to calculate a second predicted distance to the target vehicle on a basis of the second image width, and
the relative distance calculator is configured to calculate a second reliability of the second image width, and, when the second reliability is lower than the predetermined threshold, configured to calculate a second distance to the target vehicle on a basis of the smoothed real width and the second image width.

2. The vehicle exterior environment detection apparatus according to claim 1, further comprising
a relative speed calculator configured to calculate, on a basis of the first distance and the second distance, a relative speed between a traveling speed of an own vehicle on which the vehicle exterior environment detection apparatus is to be mounted and a traveling speed of the target vehicle.

3. The vehicle exterior environment detection apparatus according to claim 1, wherein the relative distance calculator is configured to calculate the first reliability, the first reliability of the first image width increasing as an own vehicle on which the vehicle exterior environment detection apparatus is mounted comes closer to a position right behind the target vehicle.

4. The vehicle exterior environment detection apparatus according to claim 2, wherein the relative distance calculator is configured to calculate the first reliability, the first reliability of the first image width increasing as an own vehicle on which the vehicle exterior environment detection apparatus is mounted comes closer to a position right behind the target vehicle.

5. A vehicle exterior environment detection apparatus comprising
circuitry configured to
calculate a first image width of a target vehicle on a basis of a first image, the first image being one of a left image and a right image,
calculate a first predicted distance to the target vehicle on a basis of the first image width,
calculate a first reliability of the first image width, and determine whether the first reliability is higher than a predetermined threshold,
when the first reliability is higher than a predetermined threshold, the circuitry being configured to
calculate a first real width of the target vehicle on a basis of the first image width and the first predicted distance,
update a smoothed real width by performing smoothing processing on a basis of the first real width, and
calculate a first distance to the target vehicle on a basis of the smoothed real width and the first image width;
calculate a second image width of the target vehicle on a basis of a second image, the second image being one of the left image and the right image and being captured at a timing later than a timing at which the first image is captured;
calculate a second predicted distance to the target vehicle on a basis of the second image width; and
calculate a second reliability of the second image width, and when the second reliability is lower than the predetermined threshold, calculate a second distance to the target vehicle on a basis of the smoothed real width and the second image width.

6. A vehicle exterior environment detection apparatus comprising:
an image width calculator configured to calculate a first image width of a target vehicle on a basis of a first image, the first image being one of a left image and a right image;
a predicted distance calculator configured to calculate a first predicted distance to the target vehicle on a basis of the first image width; and
a relative distance calculator configured to calculate a first reliability of the first image width, and, when the first reliability is higher than a predetermined threshold, configured to
calculate a first real width of the target vehicle on a basis of the first image width and the first predicted distance,
update a smoothed real width by performing smoothing processing on a basis of the first real width, and
calculate a first distance to the target vehicle on a basis of the smoothed real width and the first image width, wherein
the image width calculator is configured to calculate a second image width of the target vehicle on a basis of a second image, the second image being one of the left image and the right image and being captured at a timing later than a timing at which the first image is captured,
the predicted distance calculator is configured to calculate a second predicted distance to the target vehicle on a basis of the second image width, and
the relative distance calculator is configured to calculate a second reliability of the second image width, and configured, when the second reliability is higher than the predetermined threshold, to
calculate a second real width of the target vehicle on a basis of the second image width and the second predicted distance,
update the smoothed real width by performing the smoothing processing on a basis of the second real width, and
calculate a second distance to the target vehicle on a basis of the smoothed real width and the second image width.

7. The vehicle exterior environment detection apparatus according to claim 6, further comprising
a relative speed calculator configured to calculate, on a basis of the first distance and the second distance, a relative speed between a traveling speed of an own vehicle on which the vehicle exterior environment detection apparatus is to be mounted and a traveling speed of the target vehicle.

8. The vehicle exterior environment detection apparatus according to claim 7, wherein the relative distance calculator is configured to calculate the first reliability, the first reliability of the first image width increasing as an own vehicle on which the vehicle exterior environment detection apparatus is mounted comes closer to a position right behind the target vehicle.

9. The vehicle exterior environment detection apparatus according to claim 6, wherein the relative distance calculator is configured to calculate the first reliability, the first reliability of the first image width increasing as an own vehicle on which the vehicle exterior environment detection apparatus is mounted comes closer to a position right behind the target vehicle.

* * * * *